Aug. 4, 1964   P. W. MORGAN, JR., ETAL   3,142,971
METHOD AND APPARATUS FOR EMULSIFYING AND TEXTURATING FATS
Filed March 28, 1961   5 Sheets-Sheet 1
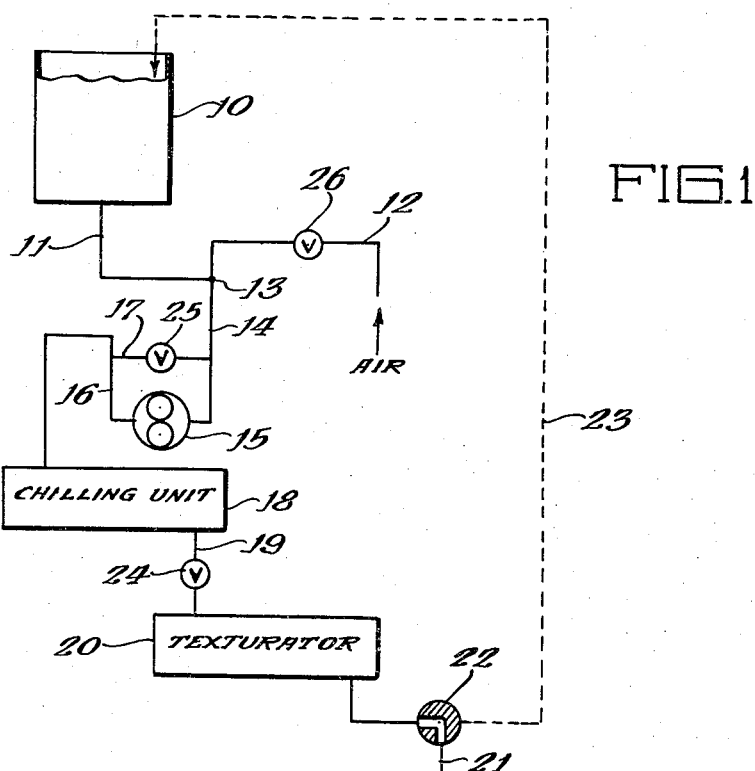
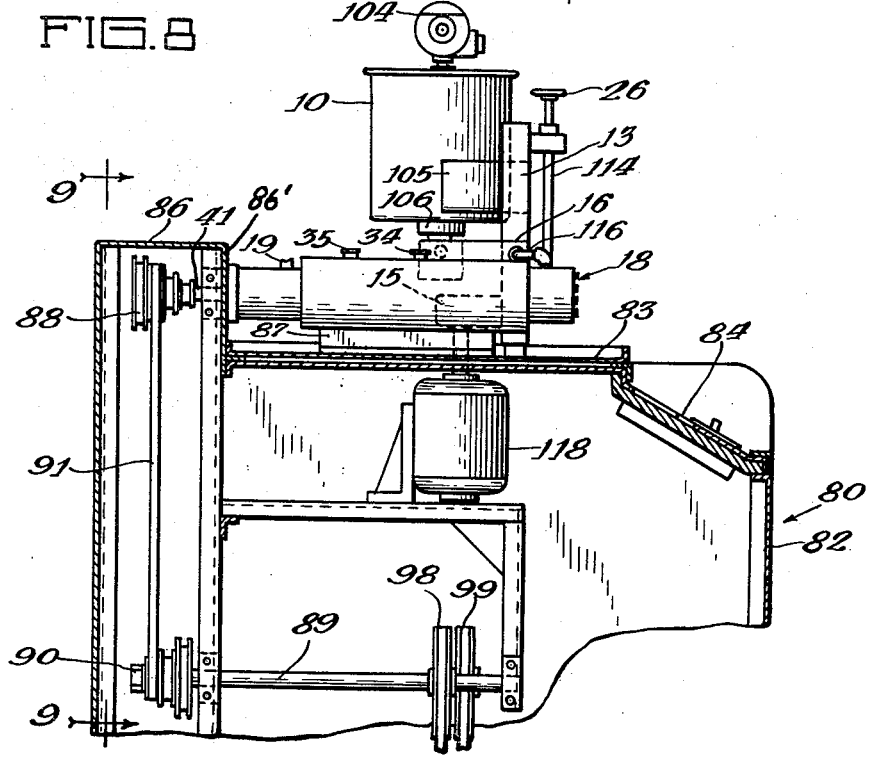

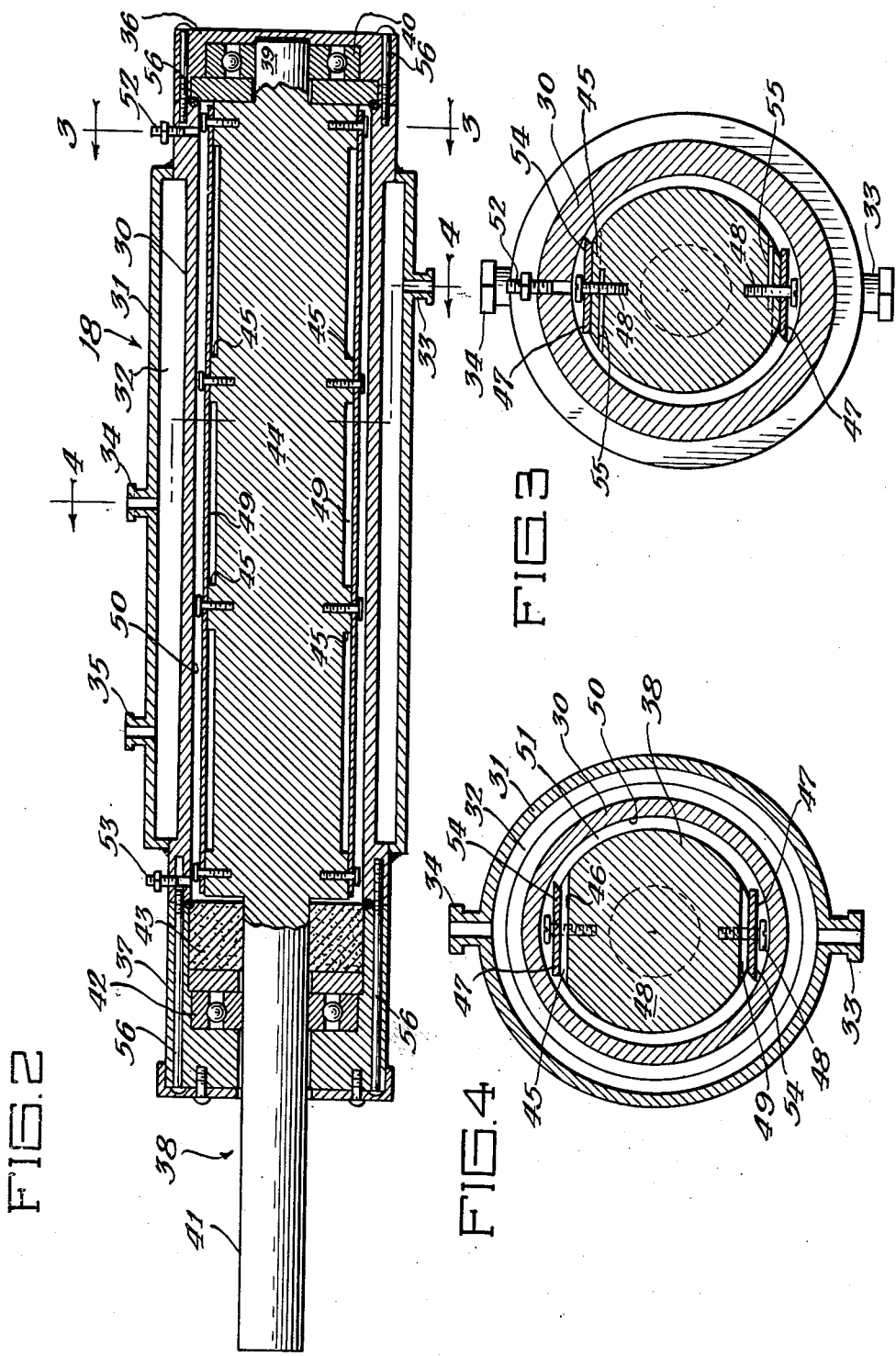

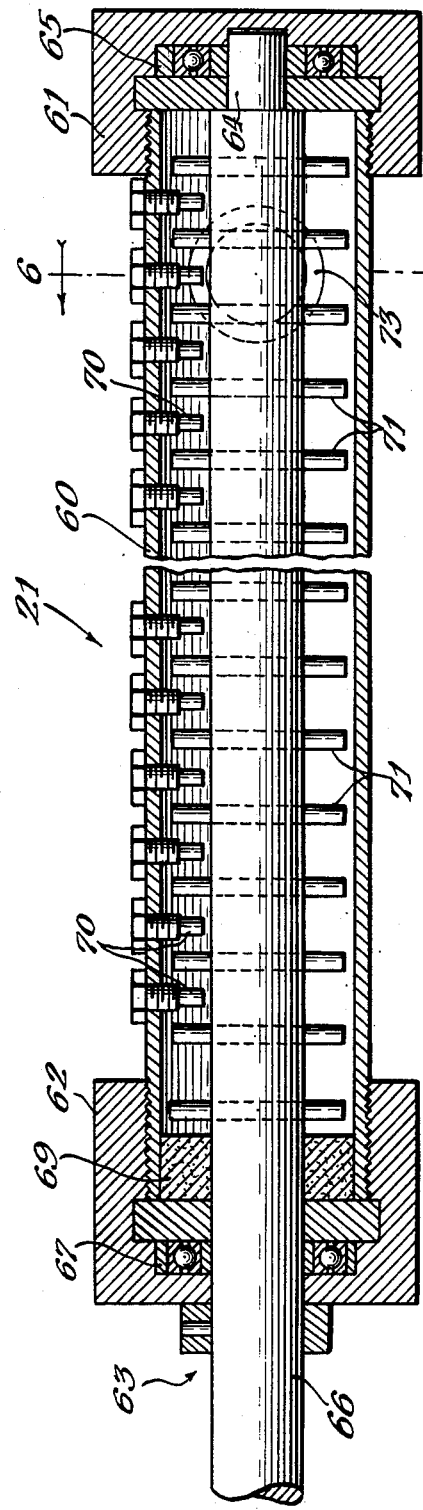

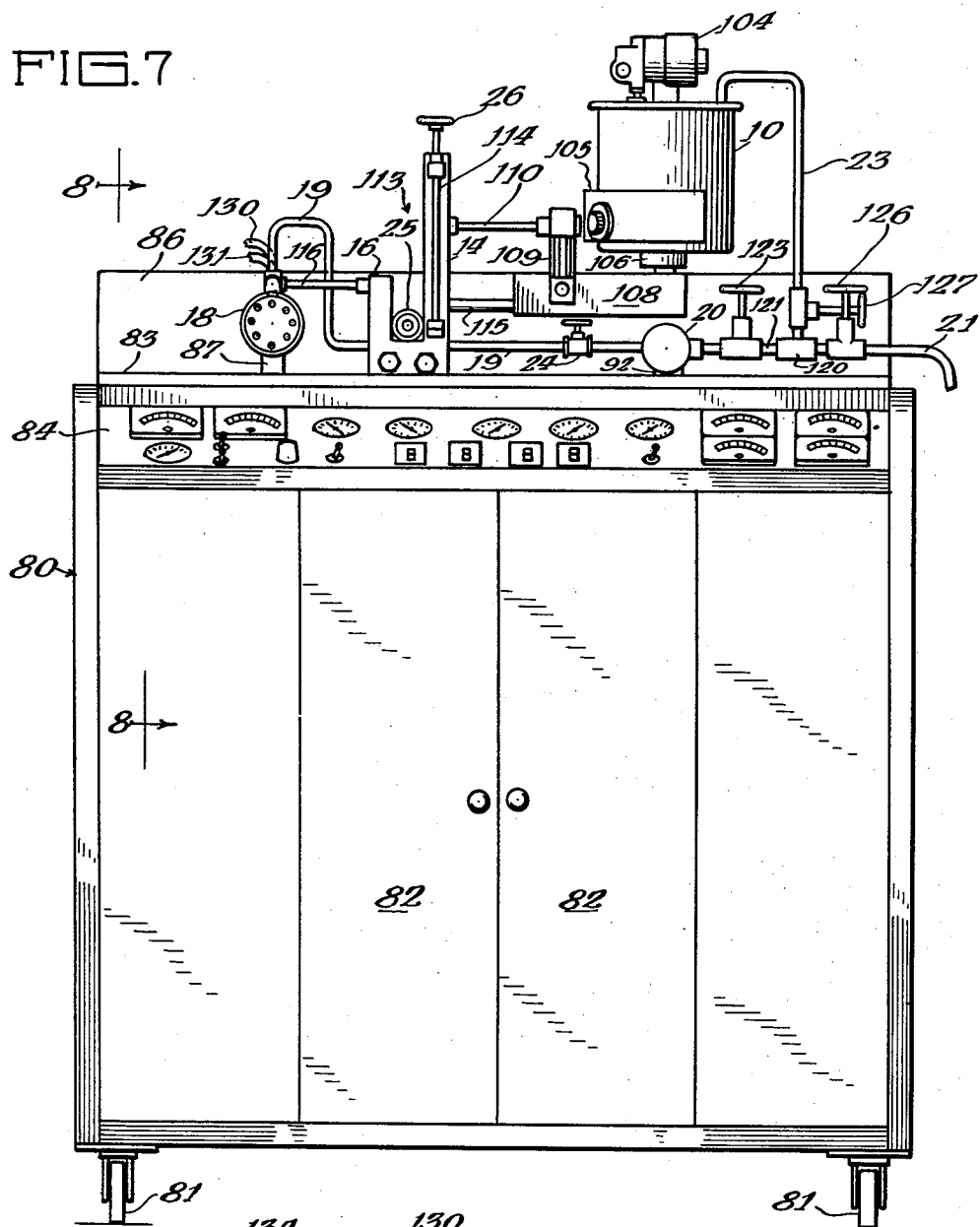
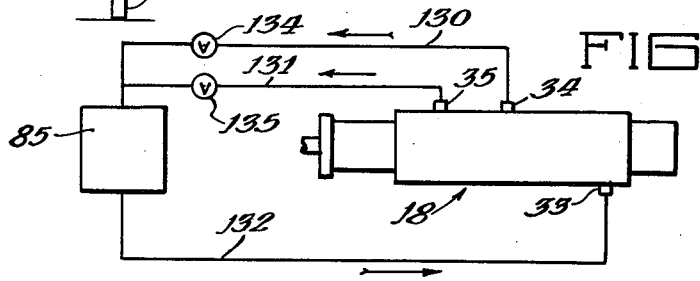

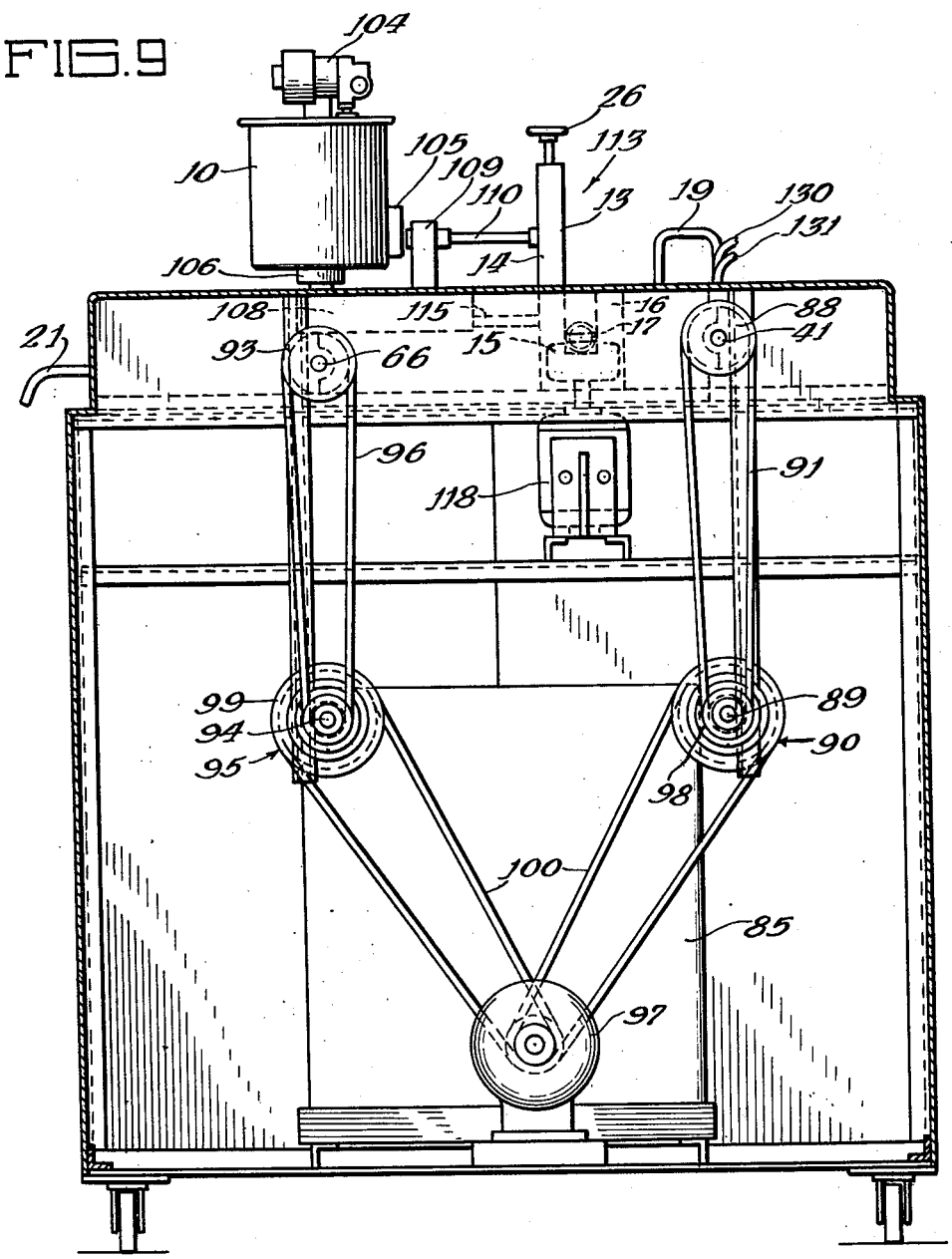

United States Patent Office 3,142,971
Patented Aug. 4, 1964

3,142,971
METHOD AND APPARATUS FOR EMULSIFYING AND TEXTURATING FATS
Perry W. Morgan, Jr., New Orleans, La., and Harvey D. Royce, deceased, late of New Orleans, La., by Marjorie Baker Royce, executrix, New Orleans, La., assignors to Hunt Food and Industries, Inc., a corporation of Delaware
Filed Mar. 28, 1961, Ser. No. 100,779
4 Claims. (Cl. 62—342)

This invention relates to an improved method and apparatus for emulsifying and texturating fats which is particularly well adapted for laboratory use.

In the manufacture of shortening, a gas such as air or nitrogen is mixed with a heated freely flowing clear fat, such as an hydrogenated oil. The mixture is then subjected to a shock chilling in an internal type chilling unit which supercools the fat and initiates the crystallization thereof. The internal type chilling unit has certain advantages over the chilled roll type since it provides a closed system.

The supercooled fat is then passed through a device, referred to herein as a texturator which controls crystallization and which otherwise agitates or beats up the mixture so as to provide a smooth white creamy substance meeting the commercial standards for shortening. The texturator, in addition to agitating or beating the mixture, puts enough mechanical work into the supercooled fat as to control the temperature in a manner to obtain the desired extent of crystallization. As far as temperature control is concerned, the temperature of the fat must not be increased up to the melting point of the crystals. The mechanical working also serves to physically break up any large crystalline formations which may occur in order to maintain fluidity, and of course the emulsified gas in the mixture also contributes to the desired fluidity of the fat-gas mixture.

The usual equipment now available for carrying out the above process is plant equipment which is designed to operate at a high rate, such as 500 to 10,000 pounds per hour, and at pressures of the order of 250 pounds per square inch or more. Due to the high pressures involved, and to various other reasons, it has not heretofore been possible to provide comparable equipment suitable for laboratory use, in the sense that it can operate at a rate of from 10 to 50 pounds per hour.

It is an object of this invention to provide an improved method and apparatus which is capable of duplicating the results of the aforementioned plant equipment, but on a small scale, suitable for use in a laboratory, where a number of formulations must be run in the course of a day, and where only from 3 to 10 pounds of product is required for each formulation.

It is another object of this invention to provide apparatus of this type which is in the form of a self contained portable unit which can readily be moved from one place to another in a laboratory and which does not require connection to air, water, or refrigeration lines, and in which the components are conveniently arranged.

According to this aspect of the invention the apparatus includes a cabinet which provides a work surface on which certain equipment, compounds and controls therefor are located. The motors and certain other mechanism are located within the cabinet and beneath the work surface. The drive mechanism connecting the exposed components and the motors is arranged at the rear of the cabinet where it may be enclosed and will not constitute a safety hazard.

In the previously mentioned plant equipment, the dispersion of the gas to produce an emulsified product is effected primarily by the action of the chilling and of the texturating units.

It is a further object of this invention to provide a method and apparatus in which the emulsification step is at least partially separated from the chilling and texturating steps so as to permit an independent control of the latter two steps, thus providing closer control of the characteristics of the product.

According to this invention, an improved process is obtained if the fat-gas mixture is emulsified prior to shock chilling, and if the back pressure on the emulsion during the texturating step is greatly reduced or even eliminated.

This method is particularly suitable for laboratory use because it permits the use of lower pressures during shock chilling and it also provides a greater latitude of control of physical conditions during shock chilling. Furthermore, this latitude of control can be obtained by the use of only three control elements, a gas content, control valve, a flow control valve, and a pressure control valve.

Another object of this invention is to provide in an apparatus of this type, an improved chilling unit which embodies improved wiping action and localized temperature control.

Other objects, features and advantages will become apparent as the description proceeds.

With reference now to the drawings in which like reference numerals designate like parts:

FIG. 1 is a flow diagram illustrating the operation of the system;
FIG. 2 is a sectional elevation through the chilling unit;
FIG. 3 is a section taken along line 3—3 of FIG. 2;
FIG. 4 is a section taken along line 4—4 of FIG. 2;
FIG. 5 is a sectional elevation of the texturator;
FIG. 6 is a vertical section taken along line 6—6 of FIG. 5;
FIG. 7 is a front elevation showing the complete apparatus;
FIG. 8 is a fragmentary end section taken along line 8—8 of FIG. 7;
FIG. 9 is a rear section taken along line 9—9 of FIG. 8;
FIG. 10 illustrates a modified arrangement for the discharge end of the texturator; and
FIG. 11 is a diagram illustrating the connections between the chilling unit and the refrigerating unit.

With reference now to FIG. 1, the reference numeral 10 designates a feed bowl from which extends a conduit or fat line 11. A gas line 12 communicates with the fat line 11 at a mixing point 13, so that the fat and the gas may be mixed with each other.

From the mixing point 13, the mixture passes through a pump 15, such as a gear pump which has an inlet 14 and an outlet 16. A by-pass 17 connects the inlet and outlet in order to provide an initial stage of emulsification.

From the outlet 16, the emulsified mixture passes to a chilling unit 18, and thence through a line 19 to a texturator 20. The texturator has a discharge outlet 21.

A two-way valve 22 may be interposed in outlet 21 which communicates with a reflux conduit 23 extending back to the feed bowl 10. Thus, when a container is being filled from the discharge outlet 21, the latter may be cut off without interrupting the flow through the system.

The capacity of the pump 15 is several times that of the intended rate of flow through the chilling unit 18, and the excess delivery is recirculated through the pump by means of the by-pass 17. It is this recirculation of the gas and fat mixture that results in an initial emulsification with the result that when the mixture enters the chilling unit it has already been emulsified to a high degree.

The action of the chilling unit will be described in detail hereinafter, but it can be pointed out at this time that although an additional degree of emulsification may take place within the chilling unit, it has been found that greatly improved results are obtained if the mixture has been emulsified prior to its entry into the chilling unit.

The means for controlling the operation of the system are needle valves and are relatively few. They comprise a flow control valve 24 in the line 19, a by-pass valve 25 in the by-pass 17, and a gas feed valve 26 in the gas line 12. The through-put of the system is controlled by the by-pass valve 25, and the pressure in the chilling unit is controlled primarily by the flow control valve 24 for a given setting of the by-pass valve 25. Thus the rate of withdrawal of the heated fat from the feed bowl 10 is controlled by the by-pass valve 25 without the necessity of providing a separate valve in the fat line 11. The proportioning of gas to liquid is controlled by the gas feed valve 26.

With reference now to FIGS. 2 to 4 in which the construction of the chilling unit 18 is shown, the latter comprises a cylindrical casing 30 having a jacket 31 surrounding the same so as to provide a cooling chamber 32. An inlet 33 and two outlets 34 and 35 are provided for the chilling chamber so that a refrigerant may be circulated therethrough.

Thus, the inner surface of the casing 30 constitutes a chilling surface 50 with which the emulsion is brought into contact. Means, in the form of wiper blades 47, are provided to remove the emulsion from the chilling surface substantially instantaneously with the contact so as to maintain a continuous flow of the emulsion through the chilling unit.

Caps 36 and 37 are provided for the ends of the casing. A rotor 38 is disposed within the casing 30, one end 39 of which is journaled in the cap 36 by a suitable ball bearing unit 40. The other end of the rotor is extended to provide a shaft 41 which extends through the cap 37 and is journaled therein by a ball bearing unit 42. A mechanical pressure seal 43 of a suitable type surrounds the shaft 41 at a point inwardly of the bearing unit 42.

The enlarged body portion 44 of the rotor 38 is of a dimension such as to provide a narrow annular chamber 51 through which the emulsion travels from an inlet 52 at one end of the chamber 51 to an outlet 53 at the other end. The enlarged body portion 44 is slabbed in such a manner as to provide two sets of lands 45 which project upwardly from slabbed surfaces 46. Wiper blades 47 are loosely mounted on the lands 45 by a pin type of mounting in which the pins may be in the form of screws 48 to facilitate initial adjustment. The screws 48 take into the lands 45, and the body portion 44 of the screws 48 may be drilled and pinned as shown at 55 in FIG. 3 to prevent loosening of the screws.

The slabbed rotor surfaces 46 thus provide passageways 49, as shown in FIGS. 2 and 4, which extend beneath the wiper blades 47. The rotor rotates in a clockwise direction as viewed in FIGS. 3 and 4 and the leading edge of each blade is acute to provide a wiping edge 54 for cooperation with the chilling surface 50.

The loose connection between the wiper blades 47 and the screws 48 permit both bodily outward movement of the blades and also rocking movement of the blades so that the scraping edge 54 will be urged into contact with the chilling surface 50 by centrifugal force.

The caps 36 and 37 may be suitably secured to the casing 30 by means of tie bolts 56.

The emulsion, as it travels from right to left through the chamber 51 comes in contact with the chilling surface 50 and is shock chilled, or supercooled, which initiates a change in the physical properties of the emulsion. However, the wiper blades 47 remove this chilled layer of emulsion substantially instantaneously and before such time as crystal growth will solidify the same. As it is removed, the chilled emulsion is displaced by the blade into and commingled with the main stream of the emulsion as it passes through the chamber 51. This is accomplished by providing the passageways 49 located beneath the blades.

However, since this passageway is not continuous, but is interrupted by the lands 45, it has been found that the chilled emulsion will tend to pack between the lands 45 and the wiper blades 47, thus impeding the desired free movement of the blades with respect to the screws 48. According to my invention, this packing tendency has been eliminated by providing an eccentric path for the blades, which has the result of causing a continuous fluttering of the blades. This fluttering tends to maintain the surface of the lands 45 free from accumulations of chilled emulsion, and thus improves the scraping action.

The eccentric path is provided by mounting the rotor 38 eccentrically in the end caps 36 and 37 with respect to the cylindrical chilling surface 50. Another advantage of the eccentric rotor mounting is that the flow of mixture beneath the wiper blade 47 tends to be a pulsating flow which assists in avoiding deposit of the mixture up on the lands 45.

The texturator 20 is a device for working the emulsion as it passes through the unit from one end to the other in order to maintain its fluidity during crystal growth. The heat of crystallization increases the temperature of the emulsion, and the mechanical working tends to increase it further. Thus, the texturator exercises a temperature controlling effect on the emulsion, but in the present system, no heat need be removed at this stage of the process, and none added externally except in the occasional situation wherein relatively small amounts of heat may be added as pointed out below.

The texturator 20, as shown in FIGS. 5 and 6 comprises a cylindrical casing 60 having screw threaded end caps 61 and 62. A rotor 63 is mounted in the casing 60, one end 64 of the rotor being journaled in the end cap 61 by means of a suitable ball bearing unit 65. The other end of the rotor is extended to provide a shaft portion 66 which extends through the end cap 62 and is journaled therein by a suitable ball bearing unit 67. A suitable mechanical pressure seal 69 is provided interiorly of the ball bearing unit 67.

The working is accomplished by two sets of interleaving breaking pins, one set 70 being mounted in the casing 60, and the other set 71 being mounted in the rotor 63. The pins 70 of one set may be in the form of dog point screws which may be arranged in any suitable manner, either spirally, or in a straight line as shown. The rotor may be drilled to provide bores located at regular intervals, and the pins 71 of the other set may be press fitted within the bores, preferably projecting outwardly at both ends from the rotor. In the arrangement shown, there may be about a ⅛ inch clearance between pins.

Suitable inlet and outlet pipes 72 and 73 are provided at either end of the casing 60 for connection into the system of FIG. 1.

The complete apparatus is shown in FIGS. 7 to 9. It comprises a cabinet 80 mounted on casters 81. The cabinet provides an enclosure having doors 82, and the top of the cabinet provides a work surface 83. Disposed forwardly of the work surface is an instrument panel 84 on which the various switches and gauges may be located. A compressor 85 is disposed within the cabinet 80, and suitable pipes extend from the compressor 85 to the inlet 33 and the outlets 34 and 35 of the cooling chamber 32 of the chilling unit 18.

Located at the back of the work surface 83 is a back enclosure 86 in which is located the drive mechanism for the chilling unit 18 and the texturator 20. By virtue of this arrangement, no rotating parts are exposed which would constitute a safety hazard.

As shown in FIG. 8, the chilling unit 18 is mounted on the work surface 83 by means of a suitable bracket 87, and the outlet end abuts the wall 86' of the back enclosure 86. The rotor shaft 41 thus extends through the wall 86' and into the back enclosure, and a four-step pulley 88 is mounted on the rear end of the rotor shaft 40. An idler shaft 89, suitably journaled in the framework of the cabinet, carries at its rear end a four-step pulley 90, and at its front end a drive pulley 98. The rotor 38 of the chilling unit is thus driven from the idler shaft by means of a belt 91 and step pulleys 88 and 90.

The texturator 20 is mounted on work surface 83 by a bracket 92 and the arrangement is similar, shaft 66 extending through the wall 86'. A stepped pulley 93 is mounted on the end of the rotor shaft 66, and is driven through belt 96 and stepped pulley 95 carried by an idler shaft 94, the latter being provided at its front end with drive pulley 99.

The idler shafts 89 and 94 may be driven by a common motor 97 by means of belts 100 which engage the drive pulleys 98 and 99.

The stepped pulley arrangement provides a variable speed drive which makes it possible to vary the speed of the rotors of the chilling unit 18 and texturator 20 with respect to each other so that the various formulations may be subject to processing conditions in accordance with requirements of the particular job. The back wall of the cabinet 80 may be removable to facilitate the change of speed ratios.

Also mounted on the work surface 83 by suitable means, not shown, is the feed bowl 10 which includes a stirrer 104, a thermostatically controlled heater 105, and an outlet 106. The fat line 11 which communicates at one end with the outlet 106 includes a manifold block 108, a flow meter 109, and a conduit 110, all connected in series with each other.

The pump 15 is mounted above the work surface 83 as shown in FIG. 9, and is driven by a motor 118.

Located on the work surface 83 in front of and connected to pump 15 is a U-shaped manifold structure 113, one leg of which constitutes the pump inlet 14, and the other leg the pump outlet 16. Conduit 110 of the fat line 11 connects with the inlet leg 14 of the manifold 113 at the mixing point 13. The upper end of the inlet leg 14 communicates wtih a downwardly extending glass tube which serves as a flow meter 114. The gas feed valve 26 is disposed between the inlet leg 14 and the flow meter 114. The lower end of the glass tube is the gas inlet 12, and may be open to the atmosphere, or connected to a supply of other gas.

The purpose of the manifolds 108 and 113 is to provide means for heating the fat line 11 and the pump inlets 14 and 16 which pass therethrough, in order to prevent such increase in viscosity as would interfere with the proper operation of the system. To this end electric heating elements (not shown), are embedded in the manifold 108 and in both legs of manifold 113. An electric conduit 115 connects the two manifolds to accommodate the electric conductors, and other suitable electric connections, not shown, are also provided.

The by-pass 17 connects the inlet and outlet legs 14 and 16 and the operation thereof is controlled by the by-pass valve 25. A conduit 116 connects the outlet leg 16 of the manifold with the inlet 52 of the chilling unit 18.

The chilling unit 18 is connected to the texturator by a conduit or line 19 as shown in FIG. 7 in which is interposed the flow control needle valve 24.

The texturator 20 can be connected to the discharge 21 either through the two-way valve 22, shown in FIG. 1, or in the manner shown in the modification of FIG. 10. Here, in addition to the outlet 73, there is an auxiliary outlet 74 (not shown in FIG. 5) which is located between the inlet and outlet 72 and 73. The two outlets 73 and 74 communicate with a manifold block 120, shown in FIGS. 10 and 7, by means of conduits 121 and 122. Valves 123 and 124 are interposed in the conduits 121 and 122 respectively. This arrangement permits a variation in the degree of texturating that is imparted to the chilled emulsion passing through the texturator 20, and coupled with the speed changing arrangement provided by the stepped pulleys 93 and 95, permits a close control of the amount of mechanical heat that is put into the emulsion at this point. A greater degree of heat may be added by use of an infra-red heater 125 as shown in FIG. 10.

The manifold block includes outlets communicating with the discharge 21 and with the reflux line 23, as shown in FIG. 10 and a separate valve 126 and 127 may be provided for each, rather than the two-way valve of FIG. 1.

Another type of variable control provided is the localized temperature control provided for the chilling unit 18, as illustrated in FIG. 11. As shown in FIG. 2, the chilling chamber 32 is provided with an inlet 33 at one end, an auxiliary outlet 34 in the middle, and a main outlet 35 at the discharge end. These outlets are connected by lines 130 and 131 respectively to the refrigerating unit 85, and a return line 132 is provided to the inlet 33. Control needle valves 134 and 135 are interposed in lines 130 and 131 respectively. In normal operation, the auxiliary outlet 34 is rendered inoperative by closing the valve 134. However, the present arrangement makes it possible to throw more of the refrigeration to the feed end of the chilling unit by opening the auxiliary outlet valve 134 and partially or fully closing the main outlet valve 135. This permits a slight warming of the emulsion as it passes through the discharge end of the chilling unit 18. The effect of this control variable can be determined by withdrawing emulsion from the line 19 through a suitable valve, not shown.

The operation of the apparatus has been pointed out in connection with the description of the flow diagram of FIG. 1 and of the various parts and subassemblies. To summarize the same, a suitable clear fat such as hydrogenated oil is introduced into the feed bowl 10 and is maintained at a suitable temperature by means of the thermostatically controlled heater 105 and the stirrer 104. The rate of withdrawal of the fat from the bowl is determined primarily by the setting of the by-pass needle valve 25. As the fat is withdrawn, air or other gas is aspirated into the flow stream at point 13, and the mixture is emulsified by means of continued recirculation through the pump 15 and the by-pass 17, the pump being a positive displacement type of pump such as a gear pump. A small portion, such as 20%, of the emulsion is continuously withdrawn from the pump circuit and permitted to flow into and through the chilling unit 18. At this point the emulsion is under considerable pressure as determined by the settings of the flow valve 24 and the by-pass valve 25, although for a given setting of the former, variation in pressure can be effected by regulation of the latter.

The emulsion is supercooled within the internal type chilling unit, and the action of the same is such that the particles of emulsion are removed from the chilling surface 50 substantially instantaneously after contact and prior to the time that crystal growth proceeds beyond the nucleus stage, so that the supercooled emulsion is, by the wiper blades, returned to and commingled with the main stream of emulsion flowing through the annular chamber 51.

Crystal growth is also retarded by the fact that the fat and air have already been emulsified by the time that it enters the chilling unit, with the result that a very high quality of supercooled emulsion is produced in the chilling unit. Also the degree of supercooling can be regulated to a fine degree not only by adjustment of the usual controls of the refrigeration unit but also by regulation of the outlet valve 134 and 135 in the refrigerating line. The regulation of these control valves provides a localized temperature control which results in a certain amount of texturating within the chilling unit itself, and is much more effective in laboratory work than merely regulating the temperature of the refrigerant.

One of the important features of this invention is that the supercooled emulsion is texturated without any back pressure as contrasted with commercial installations in which a pressure of two hundred fifty pounds per square inch or more is maintained up to the discharge point. According to this invention, there is a continuous pressure drop extending between the flow control valve 24 and the discharge 21 which avoids thermal effects resulting from a sudden release of a high degree of pressure in an emulsion. The present arrangement is believed to contribute materially to the smoothness and uniform consistency of the final product. As previously indicated, the flow through the discharge outlet 21 can be interrupted without imposing any back pressure on the system by the manipulation of the valves 126 and 127, as shown in FIG. 10 or by the two-way valve 22, as shown in FIG. 1. Variation in the degree of texturating is also provided by use of the auxiliary outlet 73, by the infra-red heater 125 and by regulation of rotor speed.

The components, being of small volumetric capacity, permit a number of successive small runs of different formulations to be made in the course of a day without incurring any substantial amount of product hold up. By the use of small diameter conduits, a fairly rapid velocity of emulsion is obtained which minimizes the use of heated or jacketed lines in order to maintain desired viscosity. Aside from the heater 105 for the feed bowl, and the mechanical or radiant heat introduced at the texturator, the only points where it is sometimes necessary to introduce heat are at the manifolds 108 and 113.

Although it is of course desirable in laboratory apparatus to be able to introduce certain variables into the process, nevertheless, it has been found in the manufacture of emulsified and texturated fats or related products such as margarine, that it is of great advantage to maintain to a minimum those variables which affect pressure and rate of flow. Therefore, according to this invention, this has been accomplished by providing as principal control elements only a flow valve which is located between the chilling and texturating units, and a by-pass valve for the pump, and an inlet valve for the air or other gas. The remaining variables provided by this apparatus are principally those relating to temperature control and rotor speed.

The casing 30 is preferably formed of an aluminum alloy having high abrasive resistance and good mechanical strength, since this provides much superior heat transfer as compared with stainless steel. An example of such an alloy is one having the following nominal composition: Al 97.9%; Cu 0.25%; Si 0.6%; Mg 1.0%; Cr 0.25%. The blades 47 may be made of a similar alloy, of Micarta, or nylon, or even of steel. However, in the latter event it is desirable that the steel have a lesser abrasion resistance than the aluminum alloy of the casing so that any wear will occur on the blades which are more easily replaceable than the casing.

Although only a preferred embodiment of this invention is shown and described herein it will be understood that various modifications and changes may be made in the construction shown without departing from the spirit of the invention as pointed out in the appended claims.

We claim:

1. In an internal type shock chilling unit for use in the emulsifying and texturating of fats having an inlet end and an outlet end with respect to product flow, and having a jacket providing a chamber for refrigerant flow in the same direction as the product flow, the combination of an inlet and two outlets for the refrigerant passing through said chamber, said inlet being located at the inlet end of said chilling unit, one of said outlets constituting a main outlet located at the outlet end of said chamber, and the other outlet constituting an auxiliary outlet and spaced from said main outlet toward the mid-portion of said chilling unit, and a separate valve for each of said outlets to effect communication between said outlets and a refrigerating unit, whereby the temperature at the outlet end of said chilling unit may be elevated above that at the inlet end of said chilling unit in order to provide localized temperature control.

2. Laboratory apparatus for emulsifying and texturating fats comprising a cabinet having a lower enclosed portion, and providing an upper work surface, a back enclosure projecting above said work surface and communicating with said lower enclosure, a jacketed chilling unit and a texturator mounted on said work surface, means including a flow control valve connecting the outlet of said chilling unit with the inlet of said texturator, said chilling unit and said texturator each having a rotor shaft extending rearwardly through the wall of said back enclosure, drive means located in said lower enclosed portion and extending upwardly into said back enclosure for driving said rotor shafts, a refrigerating unit located in said lower enclosed portion, means connecting said refrigerating unit with the jacket of said chilling unit, a feed bowl located above said work surface, emulsifying means having an inlet connected with said feed bowl and an outlet connecting with said chilling unit, gas supply means communicating with said inlet, said emulsifying means comprising a positive displacement pump having a capacity in excess of twice the capacity of the system comprising said chilling unit, said flow control valve, and said texturator, by-pass means connecting said inlet and said outlet, and a regulating valve disposed in said by-pass means to regulate the pressure of the emulsion passing through said chilling unit.

3. Apparatus for the manufacture of shortening or the like which comprises an internal type chilling unit having a casing providing an internal cylindrical chilling surface, a rotor disposed within said casing and having a loosely mounted wiper blade mounted thereon for contact with said chilling surface, a texturator including a casing and a rotor, a first set of breaker pins mounted on the inner surface of said texturator casing, and a second set of breaker pins interleaved with the pins of said first set and mounted on said rotor for working a fat and gas emulsion as it passes through said texturator, means connecting said chilling unit and said texturator, a flow control valve located in said connecting means for regulating the flow of emulsion through said chilling unit, emulsifying means connected with the inlet of said chilling unit, means for supplying a fat and gas mixture to said emulsifying means under pressure, said flow control valve being operable to release said pressure as the chilled emulsion passes through said texturator, the outlet of said texturator being at substantially atmospheric pressure, said emulsifying means having an inlet, and an outlet connecting with said chilling unit, said emulsifying means comprising a positive displacement pump having a capacity in excess of twice the capacity of the system comprising said chilling unit, said control flow valve, and said texturator, a by-pass connecting said inlet and said outlet, and a regulator valve disposed in said by-pass means to regulate the pressure of the emulsion passing through said chilling unit.

4. Apparatus for the manufacture of shortening or the like which comprises an internal type chilling unit having a casing providing an internal cylindrical chilling surface, a rotor disposed within said casing and having a loosely mounted wiper blade mounted thereon for contact with said chilling surface, a texturator including a casing and a rotor, said texturator being provided with two outlets axially spaced from each other, and selective means for rendering one or the other of said outlets operative, a first set of breaker pins mounted on the inner surface of said texturator casing, and a second set of breaker pins interleaved with the pins of said first set and mounted on said rotor for working a fat and gas emulsion as it passes through said texturator, means connecting said chilling unit and said texturator, a flow control valve located in said connecting means for regulating the flow of emulsion through said chilling unit, emulsifying means connected with the inlet of said chilling unit, and means for supplying a fat and gas mixture to said emulsifying means under pressure, said flow control valve being operable to release said pressure as the chilled emulsion passes through said texturator, the outlet of said texturator being at substantially atmospheric pressure.

References Cited in the file of this patent

UNITED STATES PATENTS

| | | |
|---|---|---|
| 1,447,497 | Wennerstrom | Mar. 6, 1923 |
| 1,949,374 | Johnson | Feb. 27, 1934 |
| 1,993,264 | Duttweiler | Mar. 5, 1935 |
| 2,101,496 | Godfrey et al. | Dec. 7, 1937 |
| 2,611,707 | Rourke et al. | Sept. 23, 1952 |
| 2,737,024 | Swenson | Mar. 6, 1956 |
| 2,797,164 | McGowan et al. | June 25, 1957 |
| 2,853,390 | McGowan et al. | Sept. 23, 1958 |
| 2,867,994 | Wakeman | Jan. 13, 1959 |
| 2,970,917 | Melnick | Feb. 7, 1961 |
| 2,980,539 | Bevarly | Apr. 18, 1961 |
| 2,999,022 | Payne et al. | Sept. 5, 1961 |
| 3,006,770 | Wiedermann | Oct. 31, 1961 |
| 3,019,110 | Bevarly | Jan. 30, 1962 |